US007938159B2

(12) United States Patent

Makar et al.

(10) Patent No.: US 7,938,159 B2

(45) Date of Patent: May 10, 2011

(54) TAPE APPLICATORS

(76) Inventors: Chris Peter Makar, Vancouver (CA); Peter Clive Sewell, Vancouver (CA)

( * ) Notice: Subject to any disclaimer, the term of this patent is extended or adjusted under 35 U.S.C. 154(b) by 597 days.

(21) Appl. No.: 11/976,346

(22) Filed: Oct. 24, 2007

(65) Prior Publication Data

US 2008/0099135 A1 May 1, 2008

Related U.S. Application Data

(60) Provisional application No. 60/854,704, filed on Oct. 27, 2006.

(51) Int. Cl.

| | |
|---|---|
| ***B26D 5/00*** | (2006.01) |
| ***B29C 65/00*** | (2006.01) |
| ***B29C 63/04*** | (2006.01) |
| ***B32B 37/00*** | (2006.01) |
| ***B32B 41/00*** | (2006.01) |
| ***B65C 9/40*** | (2006.01) |
| ***G05G 15/00*** | (2006.01) |
| ***B32B 38/04*** | (2006.01) |
| ***B32B 38/10*** | (2006.01) |

(52) U.S. Cl. ......... 156/475; 156/354; 156/510; 156/538

(58) Field of Classification Search .................... 156/60, 156/160, 199, 212, 213, 229, 250, 256, 264, 156/269, 270, 324, 353, 354, 355, 361, 443, 459, 468, 475, 477, 477.1, 494, 495, 496, 510, 516, 517, 521, 530, 538, 539, 543, 544, 545, 552, 556

See application file for complete search history.

(56) References Cited

U.S. PATENT DOCUMENTS

| | | | | |
|---|---|---|---|---|
| 4,052,240 | A * | 10/1977 | Luhman et al. | 156/212 |
| 4,781,786 | A * | 11/1988 | Lerner et al. | 156/468 |
| 5,298,100 | A * | 3/1994 | Franchino et al. | 156/238 |
| 5,730,827 | A * | 3/1998 | Sewell | 156/269 |
| 6,726,613 | B1 | 4/2004 | Sewell | |
| 2003/0192639 | A1 * | 10/2003 | Mitchell et al. | 156/250 |

* cited by examiner

*Primary Examiner* — Philip C Tucker
*Assistant Examiner* — Brian R Slawski
(74) *Attorney, Agent, or Firm* — Cecil A. Rowley

(57) ABSTRACT

A bow taper having a clamping and cut-off station wherein the tape is pulled from a clamping and cut-off station to an extended position to provide a length of tape extending between said clamping and cut-off station to said extended position, and is clamped via a clamp in the station so that when the tape is applied to a case positioned to be taped by said taper on a leading corner of the case that is adjacent to said extended position tension is applied to a free span of tape between the leading corner and the clamp, cutting off tape adjacent to said clamping and cut-off station to leave a free end and releasing said clamp from clamping said tape.

11 Claims, 11 Drawing Sheets

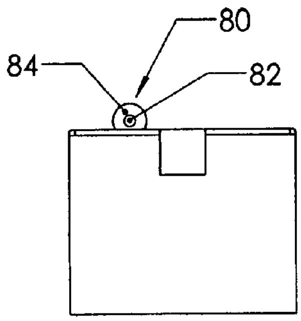
Fig. 12 A
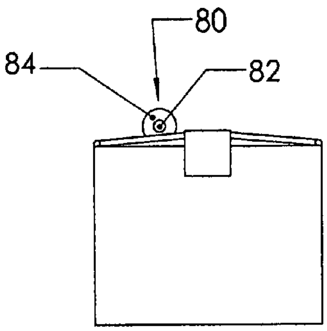
Fig. 12 A1
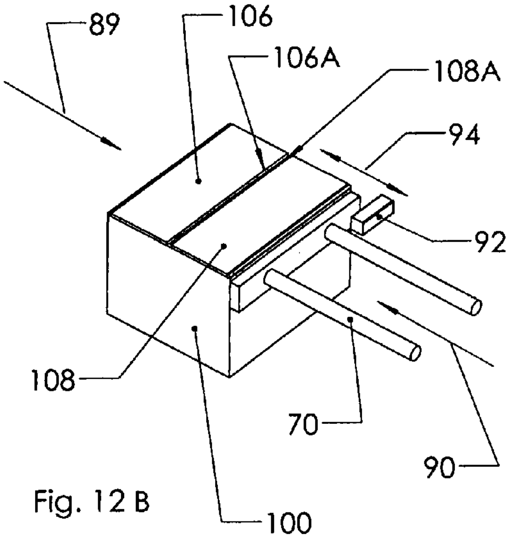
Fig. 12 B
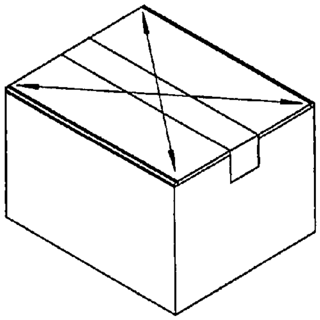
Fig. 12 C
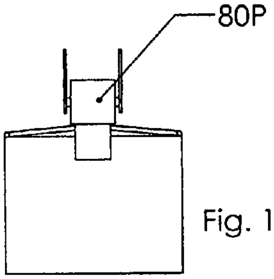
Fig. 12 P
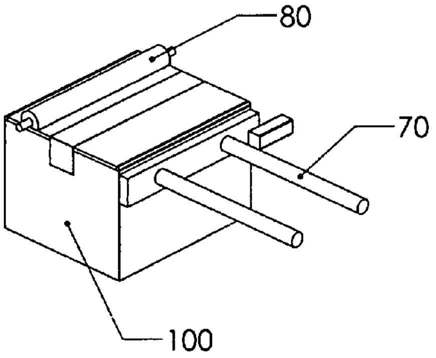
Fig. 12 D
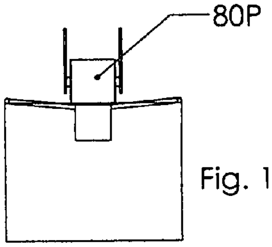
Fig. 12 P1

TAPE APPLICATORS

This application claims the benefit of U.S. of America Provisional Application No. 60/854,704 filed Oct. 27, 2006.

FIELD OF INVENTION

The invention is related to improvements in tape applicators for the packaging art, more particularly to improvements to specific elements of a tape applicator and to a new bow taper of the type shown in U.S. Pat. No. 5,730,827.

BACKGROUND OF THE PRESENT INVENTION

U.S. Pat. No. 5,730,827 teaches a taper method and apparatus generally known as a "bow taper" which is particularly suitable for taping the top and/or bottom flaps of a carton closed and operates on the principal of pulling a tape from a roll and then with the carton in position (flaps in closed position) is activated to apply the tape to the carton by means of wipe down rollers etc. and wherein the wipe down rollers and cutoff knife for severing the tape from the source are all actuated by the same mechanism.

The term "bow taper" is used herein to broadly describe this type of taper wherein a ribbon of tape is pulled from a source to provide a span of tape and then the tape is wiped onto the case being sealed.

The recent internet phenomenon of selling discrete items that have to be shipped to the consumer has generated a whole new packaging niche requiring a highly compact and flexible packing cell. Existing technologies and solutions have failed to supply a suitable, compact and practical self contained case packing work cell particularly suitable for internet type marketing and shipping. Automated warehouses have expensive sophisticated infrastructures to pick a warehouse object, but the case packing end is still done manually. In most cases the product which may involve an almost infinite variety is delivered on totes or carriers to a packing station where operators choose a case size, pack the product and then fill it with void filler (Styrofoam peanuts or equiv), seal it and then label and palletize the case. Obviously this necessitates the ability to process products with large rapidly changing carton size requirements.

With such a variety of product to be packaged, packing cannot be done automatically. Currently there are several semi automatic packing systems available that are based on a small case erector and a length of conveyor between the erector and an automatic case sealer which is used to provide the packing area. The problem with these is that the operator has to lean over the box conveyor to reach the product which has to be located on the opposite side of the box conveyor. As well, the operator has to walk considerable distance to lift the finished (closed and sealed) case from the discharge conveyor located downstream from the case sealer and palletize it and then walk back to the packing station.

Another severe limitation of prior art tape applicators is that they require a power source to move the case to be sealed to and through the tape sealing mechanism. This usually involves a powered belt or belts to power the object. The current invention does not require relative movement of the object which is having tape applied to it, and can apply tape to a variety of objects that are static.

The bow taper device taught in above referred to U.S. Pat. No. 5,730,827 (the teaching of which is incorporated herein by reference) is the original version of tapers of the same family (bow tapers) as the bow taper of the present invention. This original version requires that the all the wipe down rollers (leading (left) and trailing (right)) and the cutoff knife all be activated by the same mechanism which limits its utility as the mechanism to actuate this large assembly required considerable space and does not permit the building of an efficient case packing station since product cannot not be easily be delivered close to the case to be packed. Also, the arrangement of U.S. Pat. No. 5,730,827 does not allow for the operating elements to be made modular so that the taping system could be constructed as a modular system and built into various types of tape application machinery. This prior art arrangement also makes adjustment of the device for different length objects to be taped difficult.

U.S. Pat. No. 6,726,613 B1 issued Apr. 27, 2004 to Sewell discloses a versatile packaging station that may be incorporated into the present invention

BRIEF DESCRIPTION OF THE PRESENT INVENTION

It is an object of the present invention to provide improved elements for a tape applying system and/or to an improved bow taper tape applying system The present invention provides an improved bow taper that can be incorporated into a unique packing station the structure and operating method of which are described below. The inventions disclosed also include specific operating elements that prior to the present invention were unknown. By unique arrangement of the operating elements the current invention also allows for an easily adjustable, compact modular construction of a new bow taper tape applicator that can apply tape to a static object and be built into various types of packaging machinery. The present invention can apply the tape with controlled tension and with predictable application and precision.

The present invention is also arranged so that very little structure or mechanism exists above the article being taped. This allows for product to be delivered by various means very close to the case being packed, which was not possible with known systems such as that taught in U.S. Pat. No. 5,730,827.

Broadly the present invention relates to a method of taping a case using a bow taper having a clamping and cut-off station comprising pulling an adhesive tape ribbon from said clamping and cut-off station to an extended position using a puller and gripper to provide a length of tape extending between said clamping and cut-off station to said extended position, clamping said tape via a clamp in said clamping and cut-off station and applying said tape to a case positioned to be taped by said bow taper on a leading corner of said case adjacent to said extended position to thereby apply tension to a free span said length of tape between said corner and said clamping and cut-off station, wiping said tape adjacent thereto against a leading end wall of said case and releasing said tape from said gripper, wiping said tape adjacent to said clamping and cut-off station onto a trailing end wall of said case positioned adjacent to said clamping and cut-off station and remote from said leading end wall, cutting off said tape adjacent to said clamping and cut-off station to leave a free end and releasing said clamp from clamping said tape.

Preferably said case and said leading corner are positioned at a different elevation than said clamp so that said length extends between said corner and clamp as a substantially free span. Broadly the present invention also relates to a bow taper comprising a puller and gripper moveable from a clamping and cut-off station to an extended position to pull tape from said clamping and cut-off station and provide a length of tape between said clamping and cut-off station and said extended position, a clamping and cut-off mechanism in said clamping and cut-off station, cut-off knife and a releasable clamp forming part of said mechanism in said clamping and cut-off station, means to activate said cut-off knife to cut said tape and means to activate said clamp to release said tape.

Preferably, said clamp has a pad for engaging a adhesive side of said tape, and wherein said pad is made of silicone rubber.

Preferably, said puller and gripper is provided with jaws between which said tape is gripped and where said jaws are each provide with a pad of silicone rubber to engage said tape.

Preferably, said bow taper further comprising a backstop, said backstop being positioned to ensure that said case is proper taping position for tape application and is provided with means to eject said case from said taping position.

Preferably, said bow taper further comprising a transverse roller positioned to wipe said tape after application to said case against an adjacent wall of said case when said case is being removed from said taper.

BRIEF DESCRIPTION OF THE SEVERAL VIEWS OF THE DRAWINGS

Further features, objects and advantages will be evident from the following detailed description of the preferred embodiments of the present invention taken in conjunction with the accompanying drawings in which;

FIG. 12 is composed of schematic views lettered A, $A_1$, Prior art (P and $P_1$) B, C and D illustrating the sequence including the insertion of the carton and withdrawal of the taped closed carton and showing effects of the operation of the hold down roll and squaring.

DETAILED DESCRIPTION OF THE INVENTION

Figure 2:
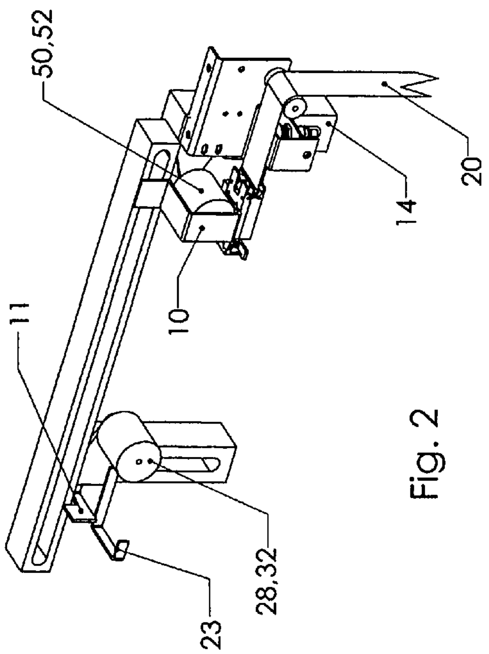
FIGS. 1 to 11 schematically illustrate with parts omitted for simplification and clarity the sequence of operation of the bow taper of the present invention.
Figure 1:
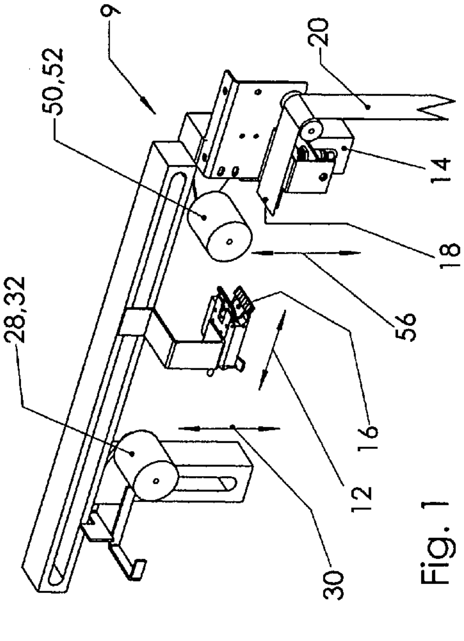
Figure 4:
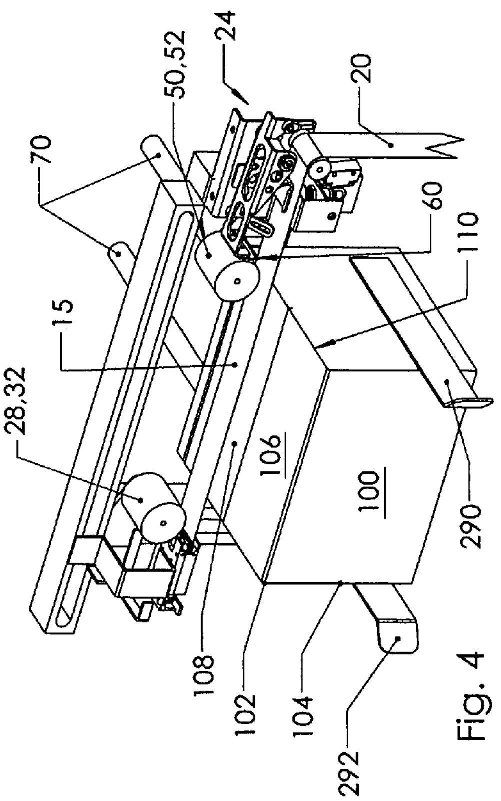
Figure 3:
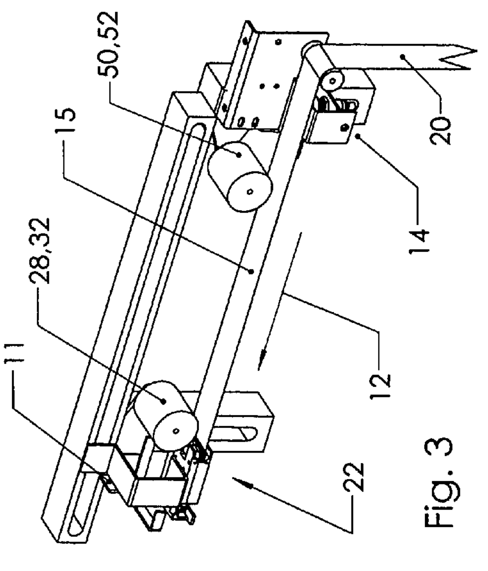

The construction of the device of the present invention provides for an improved the (del?) taping process permitting sequentially actuating the elements. The invention will therefore be described by first describing the combination of elements of the present invention and their sequence of operation with reference to FIGS. 1 to 11.

The bow taper 9 of the present invention includes a gripper and puller 10 for releasable gripping and pulling a ribbon of adhesive tape 20 which at the beginning of the sequence has grasped the tape 20 is at moved by a drive mechanism schematically represented by the two ended arrow 12 to the starting position defined by a clamping and cut off station 14 where, as will be described below, its jaws 16 grip the free end 18 of the tape 20. Next the gripper 10 is moved to the left in the illustration by drive 12 to pull the tape 20 and move the free end 18 to the extended position 22 (see FIGS. 3 and 4) the position of which is set by the adjustable stop 11 and which will be beyond the end of the case 100 remote from the clamping station 14 (this operation takes place before the carton or case 100 to be taped is put into the machine). This action provides a length of tape 15 extending from the clamping and cut-off station 14 to the extended position 22

The clamping station 14 incorporates a suitable clamping and cut off mechanism 24 (see FIG. 4, FIGS. 7 to 11 inclusive and FIGS. 13 to 16 that show the station 14 in more detail) that at the appropriate times in the sequence clamps or releases and cuts the tape 20. The clamp is operated by an actuating mechanism schematically represented by pneumatic cylinder 26 which moves the clamping pad 27 at this point in the operation to a release the clamping pad 27 which clamps the tape against a fixed shoe 29 (see FIGS. 13 to 16) thereby releasing the tape 20 to permit leading end of the tape to be pulled by the gripper 10 from the clamping and cut off station 14 to the extended position 22 beyond the location where the end of the case to be taped will be positioned.

After the tape 20 has been so extended so that the leading or free end 18 (leading in the direction of tape movement) is in the extended position 22 and a case 100 to be sealed is positioned between the extended position 22 and the station 14 in position to receive the tape the (left or leading) roller 28 which is moveable as indicated by the arrow 30 (which also represents the drive for so moving the roller 28) between its retracted or home position 32 above the path of the gripper 10 and an extended tape applied position 34 starts downward movement (movement toward the case 100 which has been inserted into the machine) and is positioned to force the tape 20 against the leading top corner 102 of the case 100 and then along the leading panel 104 of the case 100 thereby attaching the tape 20 first to the corner of the case 102 which helps to pull the flaps 106 and 108 of the case 100 closed and then to the side 104. It will be apparent that prior to using the invention on a specific case the location of the extended position 22 of the gripper 10 and thereby the location of the path of travel of the lead roller 28 between its home position 32 and its extended tape applied position 34 is defined by appropriately positioning the stop 11 the position of which is adjustable either manually of automatically as schematically represented by the arrow 35. At the same time or slightly before the roller 28 is actuated, the tape clamping and cut off mechanism 24 of the clamping and cut off station 14 (located adjacent to the opposite end (trailing) of the carton or case 100) is actuated by cylinder 26 to move the pad 27 into gripping position forcing the tape against the shoe 29 (see FIG. 13 to 16) to grip the tape 20 and thereby ensure no excess tape 20 is unwound from the roll and the length 15 of tape 20 in its fee span portion between the corner 102 and the clamping and cut-off station 14 is tight (under tension) as it is applied by the trailing (right) roller 50 as will be described below.

The downward movement of the leading wipe down roller 28 presses the tape against the carton i.e. corner 102 so that the free span length 15 of tape 20 now extends at an angle α to the top of the case (flaps 106 and 108) and in the illustrated arrangement to the horizontal (the top of the case in this case is horizontal). This movement applied tension to the free span 15 of the tape 20. The angle α is dependent on the gap g i.e. in the illustrated arrangement difference in height between the top of the case (flaps 106 and 108) and the location of the tape clamp shoe 29. The angle α will normally be in the range of between 4 and 10 degrees and obviously is defined by the gap and the length of the case i.e. distance between the leading and trailing walls 104 and 112 (the machine is normally adjusted so that the gap is the same regardless of the height of the case 100).

This movement of the leading wipe down roller 28 thus introduces tension into the tape 20 in the span between the shoe 29 and the point of attachment of the tape to the case 100 i.e. corner 102. This tension is important to the quality of the taping job.

After the tape 20 is attached to the corner 102 of case 100 as above described, the jaws 16 of the gripper 10 are released by the trip finger 23 rotating the latch 304 downward (see FIGS. 17 and 18) and the gripper 10 begins its travel toward the right as the tape is being pulled free of the jaw 16 by the continued movement of the leading wipe down roller 28 to it's extended position 34.

The trip finger 23 moves in unison with the roller 28 so that the gripper 10 does not release the tape until the tape has positively been adhered to the corner of the case 102 and the flaps 106 and 108 have been firmly pulled closed, ensuring a tightly sealed case.

Figures 5, 6, 7, 8:
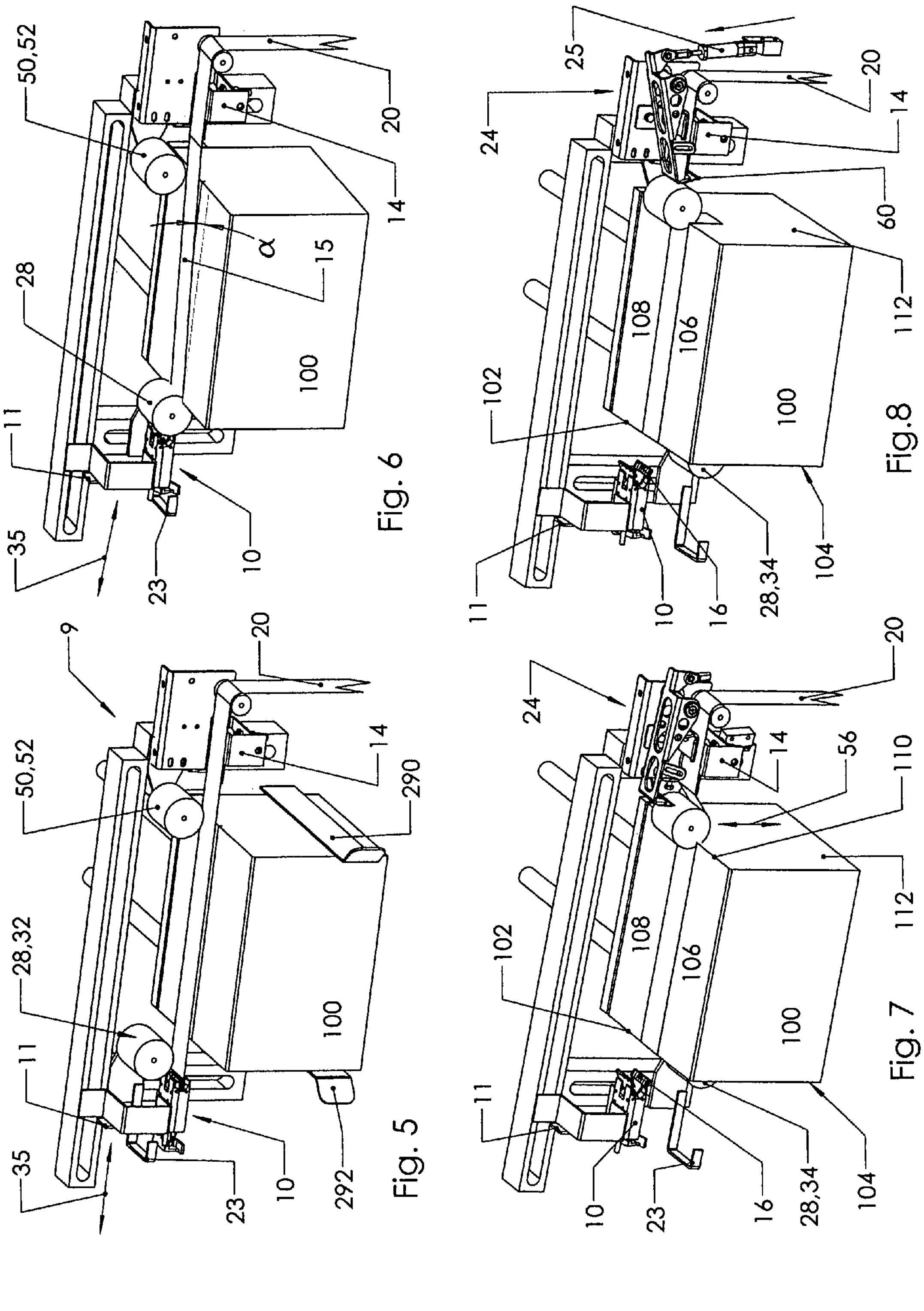
Figure 10:
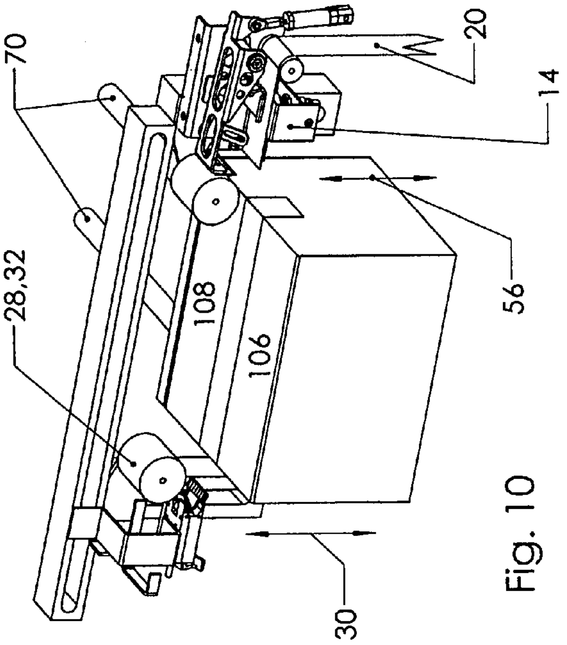
Figure 9:
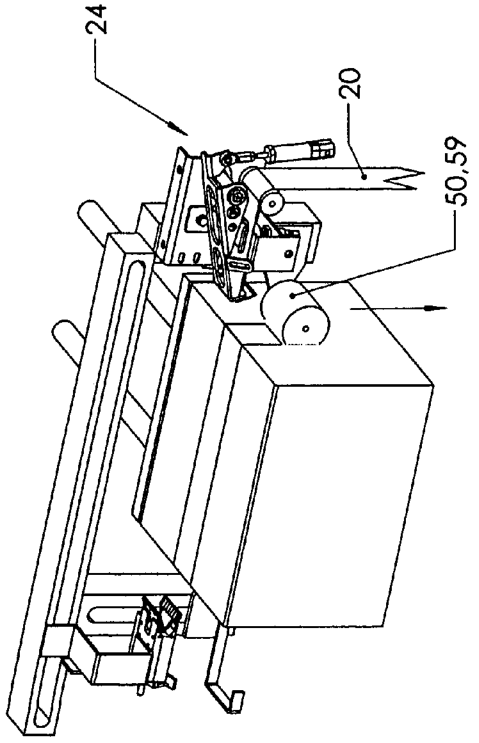
Figure 11:
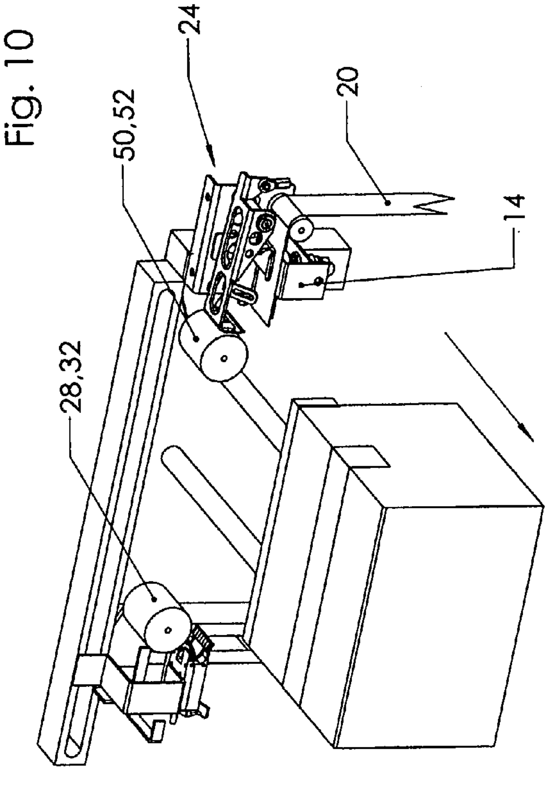
Figure 14:
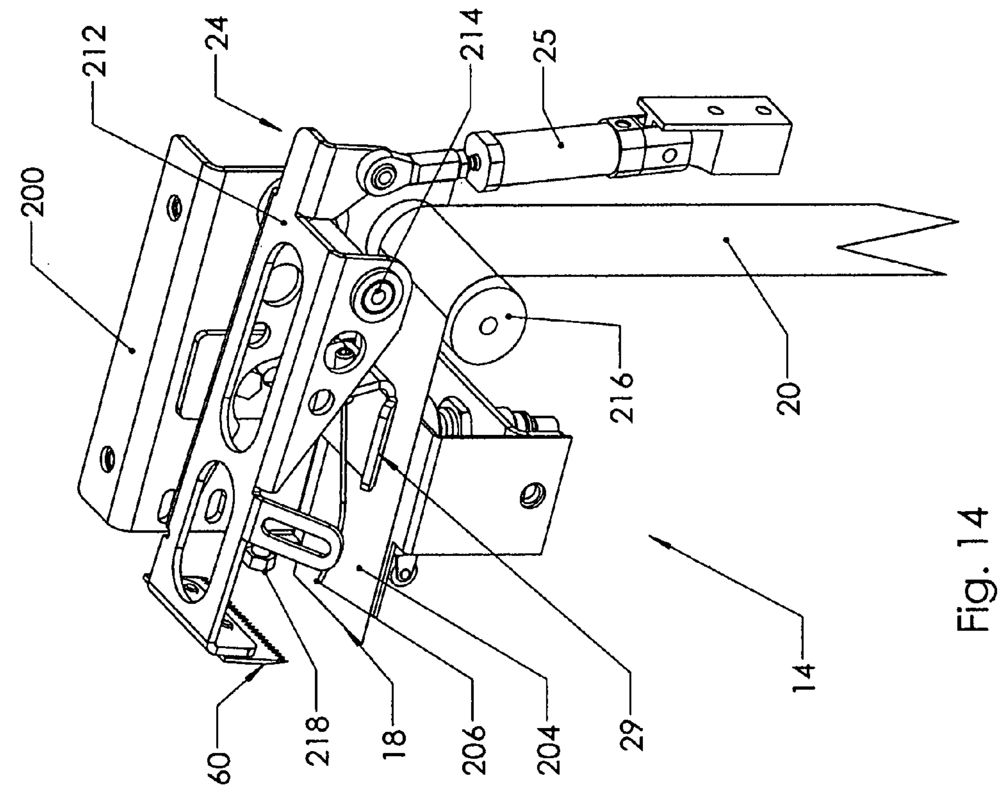
FIG. 14 is a rear isometric illustration of the tape clamping and cut off station
Figure 13:
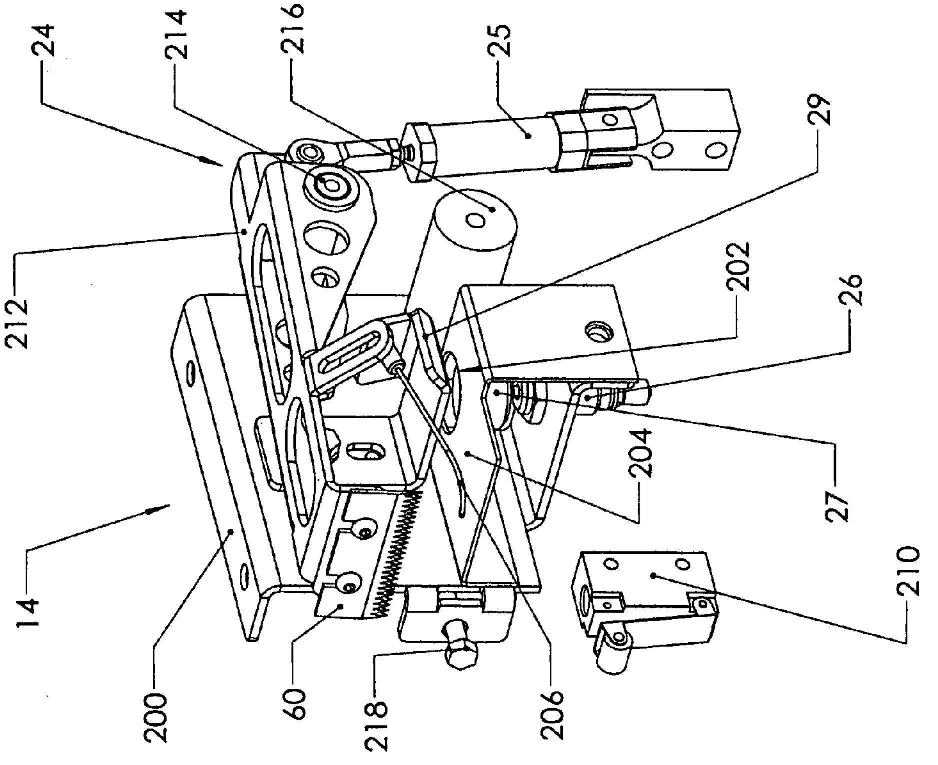
FIG. 13 is a frontal (relative to the position of a carton to be taped) isometric illustration of the tape clamping and cut off station
Figure 16:
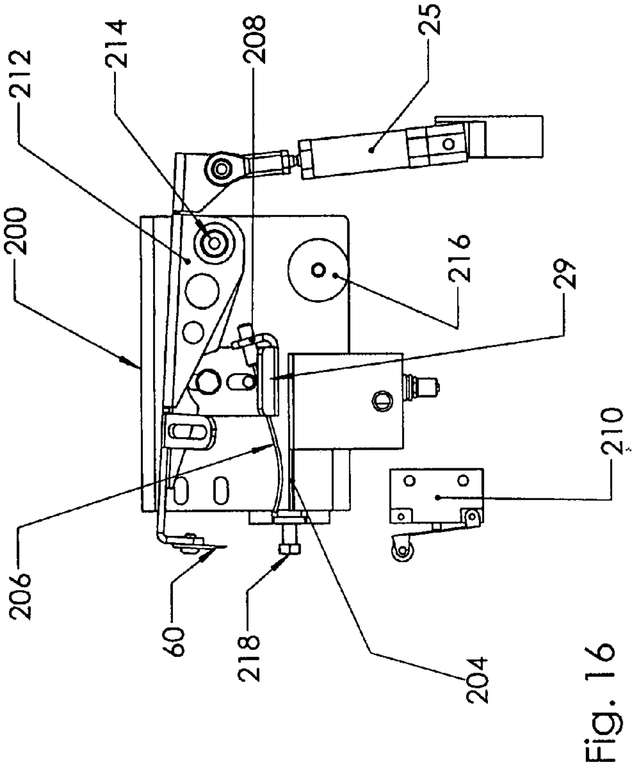
FIG. 16 is a side view of the clamping and cut off station.
Figure 16A:
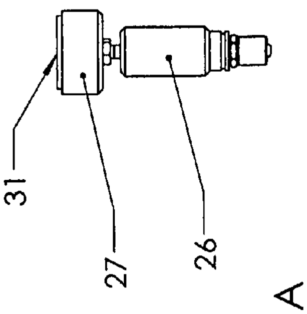
FIG. 16A is a side view of the clamping pad.
Figure 15:
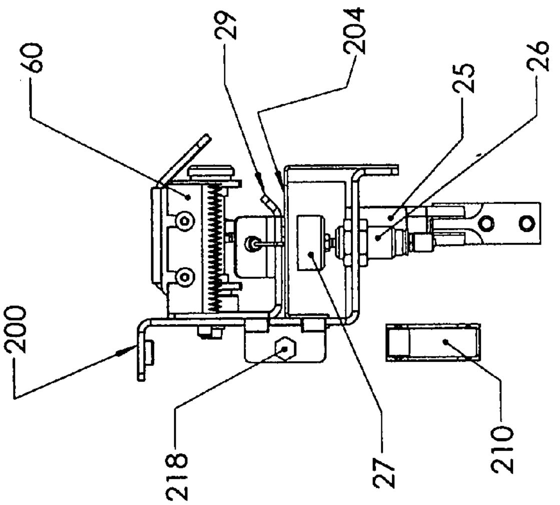
FIG. 15 is a an end view looking from the position of a carton to be taped of the clamping and cut off station

When the wipe down roller 28 has neared the end of its stroke i.e. approaches the extended position 34 the trailing (right) wipe down roller 50 positioned adjacent to the station 14 is moved from its retracted or home position 52 as illustrated in FIG. 1 to 6 inclusive toward its extended position 54 (see FIG. 16) as illustrated in FIGS. 7, 8 and 9 and as schematically indicated by the arrow 56 (see FIG. 1) which also represents the drive for this roll 50 starts down and forces the tape 20 against trailing corner 110 of the carton 100 and pulls the flaps 106 and 108 firmly closed.

When the leading wipe down roller 50 has traveled far enough that the tape 20 has been wiped around the trailing corner 110 of the case 100 and the adhesive on the tape 20 has stuck to the trailing wall 112 (see FIG. 7) the cutoff knife 60 forming part of the clamping and cut off mechanism 24 in station 14 is actuated via cylinder 25 to cut the tape 20 (see FIGS. 7 and 8). After the trailing wipe down roller 50 finishes its travel to its extended position 54 both wipe down rollers 28 and 50 are returned to their retracted or home (top) positions 32 and 52 respectively and the pushback schematically indicated at 70 (see FIGS. 10, 16 and 17) is engaged to push the taped case 100 out of the machine.

The Backstop or push back 70 provides several functions. It acts as centering locator to position the case 100 so that the tape 20 is applied along the desired line symmetrically over the adjacent, preferably butted edges of the flaps 106 and 108, and it triggers the taping cycle described above. At the completion of the taping operation it provides a mechanism to eject the taped case from the machine.

The pushback or backstop 70 also provides a means of ensuring a “flaps meeting” (adjacent edges 106A and 108A abutting see FIG. 12B) in those cases where the flaps 106 and 108 are intended to abut in the closed carton 100. The latter is achieved by the backstop providing a rigid stop for the operator to push the case firmly against prior to the tape being applied. This pressure ensures the adjacent edges 106A and 108A of the major flaps 106 and 108 are pushed together before the tape is applied. A case that has the major flaps in firm contact is considerably more rigid than one that has a gap across the major flaps.

The backstop 70 also provides a squaring device and guards the tape jaw.

Suitable guides 290 and 292 align the leading and trailing walls 104 and 112 respectively of the case 100 in proper position relative to the rollers 50 and 28 respectively. The guide 292 is moveable with the frame 450 as the machine is adjusted for a different size case (see FIGS. 22 and 23 and schematically in FIGS. 4 and 5.)

The packing fork patent, no. 6,726,613 referred to above discloses a backstop that functions as a squaring bar. The construction of the pushback so that it may be used to automatically eject heavy cases and to facilitate the zero gap closure is unique.

Turning to FIG. 12 the operation of the hold down roller 80 which in the illustrated arrangement has a central shaft 82 covered with foam sleeve 84 that rotates with the shaft and is capable of following the surface of the closed carton whether it is properly filled as illustrated in A or overfilled as shown in FIG. 12 A1 or under-filled (FIG. 12 P1) where the top flaps are folded to a position where their free edges are slightly within the case) and thus acts to press on the tape 20 as the carton is being ejected after taping and to better ensure that the tape is properly adhered to the article being taped. The rotational axis of this roller is perpendicular to the direction of movement of the carton 100 when it is being inserted or rejected from the bow taper 9. In the prior art a roller oriented with its axis perpendicular to the axis of roller 80 namely roller 80P shown in the Prior art section (FIG. 12 P and band 12 P1) was applied to wipe down the tape 20 but could not effectively perform this operation if the carton was over or under filled as indicated in P and P1 respectively.

Illustration 12B shows that carton 100 being forced as indicated by the arrow 89 into the taping position of the machine against the resistance (as indicated by the arrow 90) of the pusher 70 to force the edges 106A and 108A of the flaps 106 and 108 respectively together and square and rigidize the carton. The stop schematically indicated at 92 which may be adjustably positioned as schematically illustrated by the arrow 94 stops the rearward movement of the carton 100 when it is properly positions relative to the taper to apply the tape 20 along the desired line.

The corner pressure applied by the rollers 28 and 50 when they are operated as above described to apply the tape 20 in combination with the squaring pressure and the action of the hold down roller 80 all may be used to improve the diagonal strength of the packed and taped carton as shown in 12C. This is generally not possible with existing machinery.

When the taping operation has been completed the pusher 70 driven by cylinder 72 ejects the taped carton 100 from the machine (see FIG. 20 and 21 and the description thereof herein below for further information on the pusher or backstop 70)—this operation may be made to be automatic or manual. With a powered backstop, the filled case is forcibly ejected into the operator's hands so that he may more easily handle it further and palletize the case. As well, the operator does not have to make any effort to pull the case out of the machine FIGS. 13 to 16 inclusive show (with parts omitted for clarity) the clamping and cut off station 14 and its mechanisms 24 the operation of which has been described above. As shown the mechanism 24 includes a framework 200 which mounts the clamping system composed of the actuator 26 which moves the clamping pad 27 through a suitable hole 202 in the tape support plate 204 to force the tape 20 against the shoe 29 and thereby clamp the tape 20 between the pad 27 and the shoe 29 and prevent it from moving. A suitable hold down spring 206 extends from a bracket 108 on the shoe 29 to hold the tape against the plate 204. The clamp 27, 29 is released when the rollers 28 and 50 retract toward their home or start positions and is applied when the clamp 10 is in extended position as above described. The spring 206 also functions to prevent uncontrolled motion of the tape 20 on the return motion of the cutoff knife 60 and better ensures the tape 20 is properly located for the jaw 16 to pick up the leading end 18 of the tape ribbon 20 in subsequent motions.

The cut off knife 60 is mounted on a rocker arm 212 that is pivoted around the shaft 214 by the actuator 25 to move the knife 60 to cut the tape and then retract to the position shown in these figures. The switch 210 is tripped by movement of the roller 50 toward the extended position and this switch activates the actuator 25 of the cut off mechanism to cut the tape 20. The ribbon of adhesive tape 20 passes over tape guiding roller 216 (adhesive side facing the roller 216) and between the shoe 29 and the plate 204 i.e. over the upper surface of the plate 204 and below the shoe 29 with the adhesive side of the tape 20 facing the plate 204. Positioned at the leading end of the frame 200 is a stop bolt 218 that contacts a portion of the gripper 10 as will be described below to close its jaws 16.

Preferably the surface of the support plate 204 facing the tape will be covered with sandpaper or silicone rubber that supports the tape after its cut off. After the tape has been cut a short length of the tape as represented at the leading end 18 hangs out over the edge of this plate 204 The short length, shorter than ½ inch tends to prevent the tape from drooping and it supports itself so the gripper 10 can easily grip this leading portion 18 in the next cycle. The spring finger 206 rests lightly on the top of the tape 20 near the support plate edge keeps the tape from being pulled up with the cutoff knife 60.

The clamping pad 27 preferably will also have the surface that contacts the adhesive side of the tape coated with a layer 31 silicone rubber to prevent the tape from sticking to it.

Figure 17:
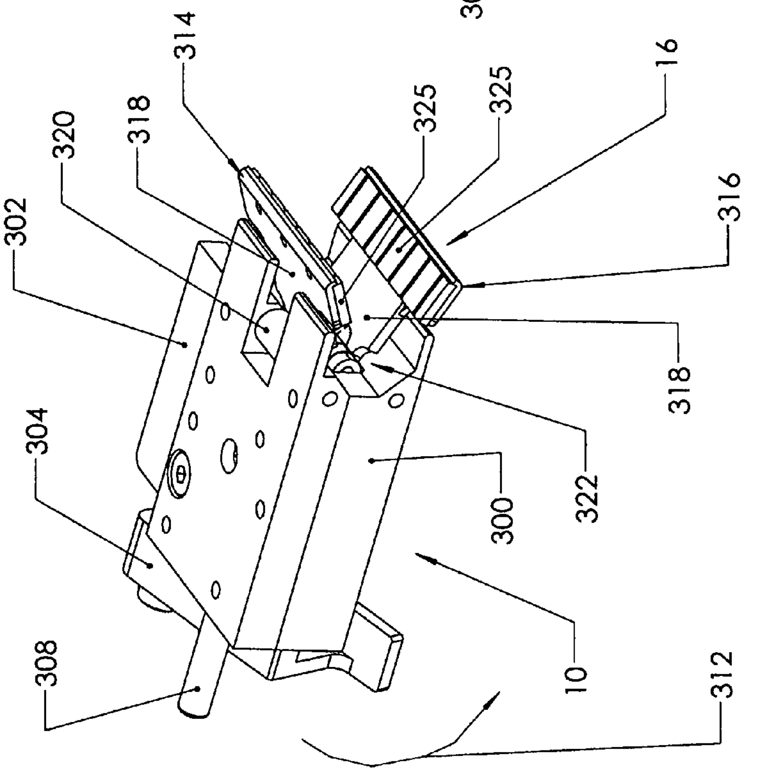
FIG. 17 is an isometric illustration of the gripper mechanism with the gripper jaws in open position.

The gripper 10 will now be described in more detail with reference to FIGS. 17 and 18. The gripper 10 is composed of an outer housing 300 that contains a slide block 302 that is mounted to slide forward and backward in the housing 300. The slide block 302 contacts the bolt stop 218 on the frame 200 of the station 14 and forces the slide block rearward relative to the housing 300 which causes the jaws 16 to close and clamp the leading end 18 of the tape 20 when the gripper 10 is moved against the frame 20. When the block has moved to jaw closing position a latch 304 pivotably connected to the bock 302 moves via the influence of spring 305 as indicated by the arrow 306 to a position to engage an abutment shaft 308 extending rearward from the housing 300 in a pocket 310 (see FIG. 18). When the gripper 10 is in its extended position (remote from the cutoff station 14 which is fixed in the machine) and the wipe down roll 28 is moved toward its extended position 34 the latch 302 is tripped (by the trip finger 25 which moves with the roller 28) and the latch 304 is moved as indicated by arrow 312 to the position shown in FIG. 17 thereby permitting relative movement between the sliding block 302 and the housing 300 permitting the jaws 16 to open and release the free end 18 of the tape 20.

Figure 18:
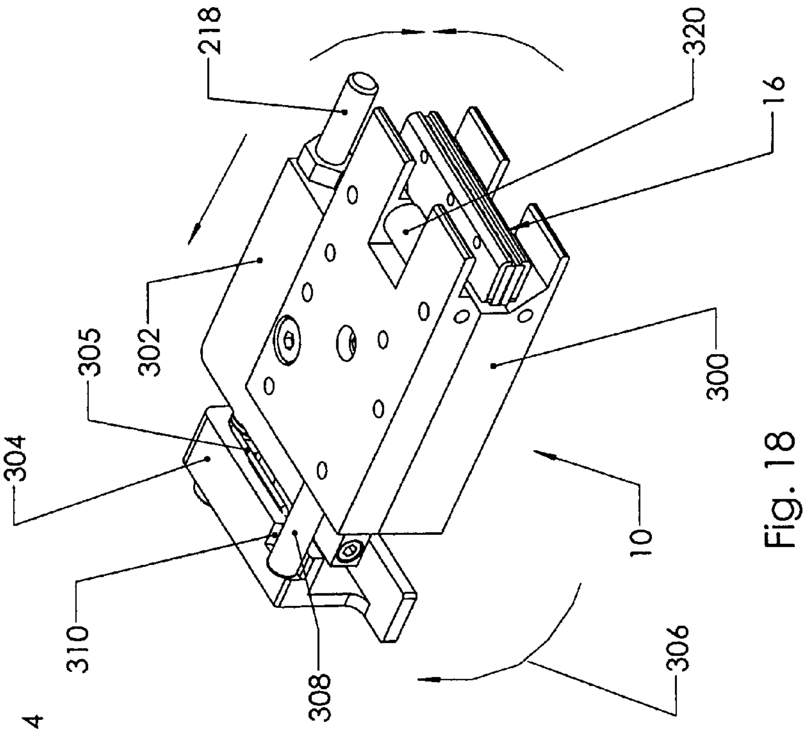
FIG. 18 is an isometric illustration of the gripper mechanism with the gripper jaws in closed position.

The jaws 16 comprise a pair of opposed jaw members 314 and 316 which are pivotable mounted to the slide block 302 and have plate elements 318 that cooperate with upper and lower guide rollers 320 and 322 respectively on the housing 300 to cam the jaws 314 and 316 into a closed gripping position (FIG. 18). Closing of the jaw members 314 and 316 is accomplished by the block 302 being held stationary by the stop bolt 218 so that further motion of the body 300 (which is attached to the drive mechanism) causes relative motion between the block 302 and housing 300 causing the rollers to cam the jaws 314 and 316 closed. This allows the jaw pads 325 to clamp on the tape 20 without imparting any movement to the tape 20.

The gripping pads 325 (one on each of the jaws 314 and 316) that contact and grip the fee end 18 of the tape 20 are formed of silicone rubber.

The use of a silicone pad 31 on the clamp pad 27 and pads 325 on the jaws 314 and 316 provides a significant advantage of other gripping surfaces as it provides a resilient pad that also provides a non stick surface. Tape adhesive does not adhere to silicone rubber and allows for the tape to be pulled free very easily after the jaws or clamp is, are opened. The very low surface energy of silicone rubbers make it ideal for this application compared to a silicone or Teflon coating that will wear off with use.

The support table 400 (see FIGS. 19 to 24) used in the present invention preferably incorporates the teachings of U.S. Pat. No. 6,726,613 B1 issued Apr. 27, 2004 to Sewell the teachings of which are incorporated herein by reference.

Figure 21:
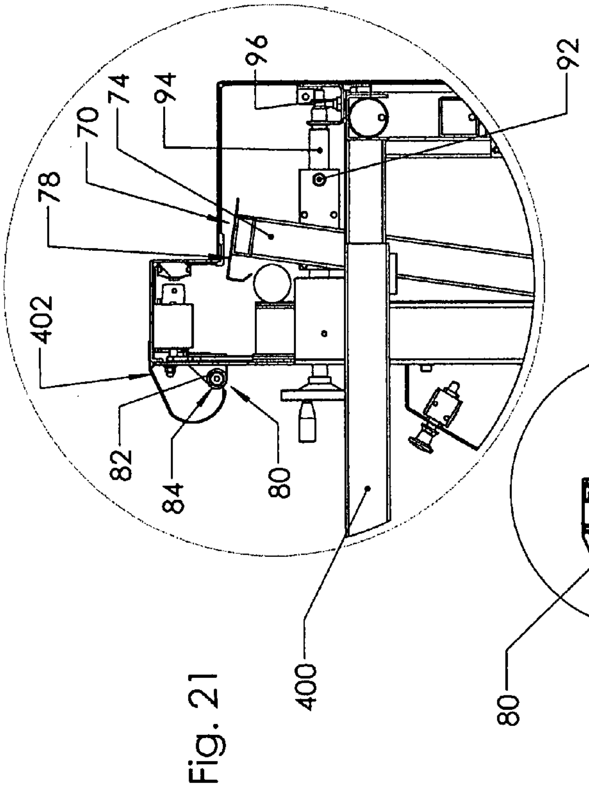
FIG. 21 is an enlargement of the contents of circle b of FIG. 20.
Figure 20:
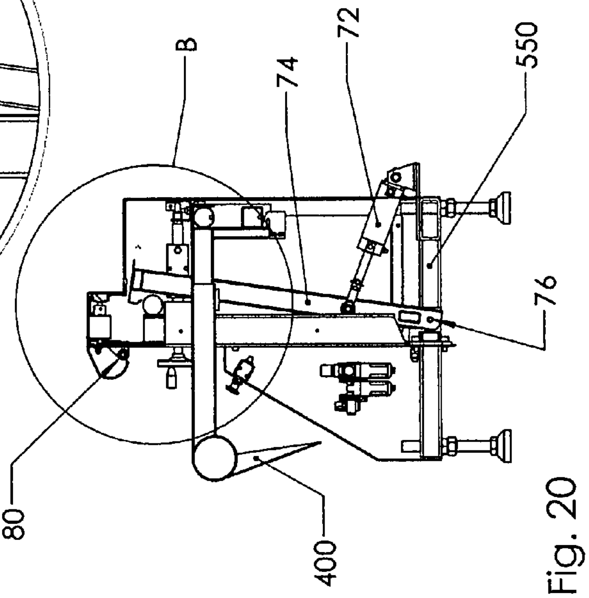
FIG. 20 is a section on the line 20-20 in FIG. 19
Figure 19:
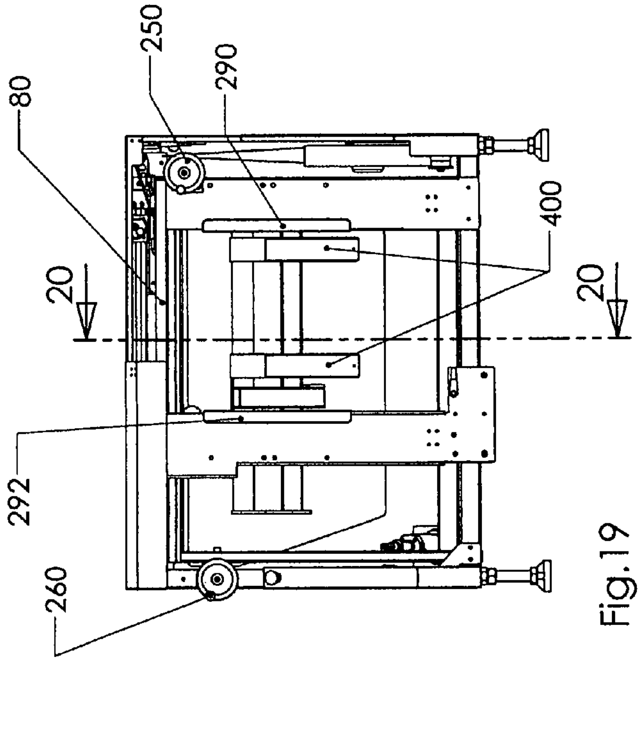
FIG. 19 is a front view (side of the machine where the cartons to be taped are fed into the machine) of the invention (with parts omitted).

FIGS. 19, 20 and 21 show the operation of the hold down roller 80 shown in FIG. 12. As shown this roller 80 extends across the front of the machine above the packing table generally indicated by the numeral 400 and is contained within a housing 402. The carton 100 is moved under this roll 80 i.e. between the support table 400 and the roll 80 as above described, functions to roll the tape down and better insure the tape joint and ensure positive tape adhesion. Obviously the height of the housing 402 and thus the roll 80 is adjustable as schematically indicated by the arrow 403 to accommodate case of different heights. In operation the leading (in the direction of movement of the case into the bow taper 9) major flap 108 hits the arced face of the front cover 402, pushing it closed, and the trailing major flap 106 is pushed down by the operator prior to the case being inserted. Roller 80 then keeps them closed.

FIGS. 20 and 21 show the mounting of the pusher 70 in more detail. As can be seen the pusher 70 comprises an arm 74 pivoted to the bottom of the main frame 550 on pivot pin 76. The cylinder 72 referred to above is spring biased to resist rearward movement of the arm 74 to facilitate (provide back-pressure as the carton 100 is inserted into the machine and drives the arm 74 to eject the taped carton). In the illustrated arrangement an L-shaped abutment element 78 is mounted at the free end of the arm 74 and is positioned to engage the adjacent carton wall.

Figure 26:
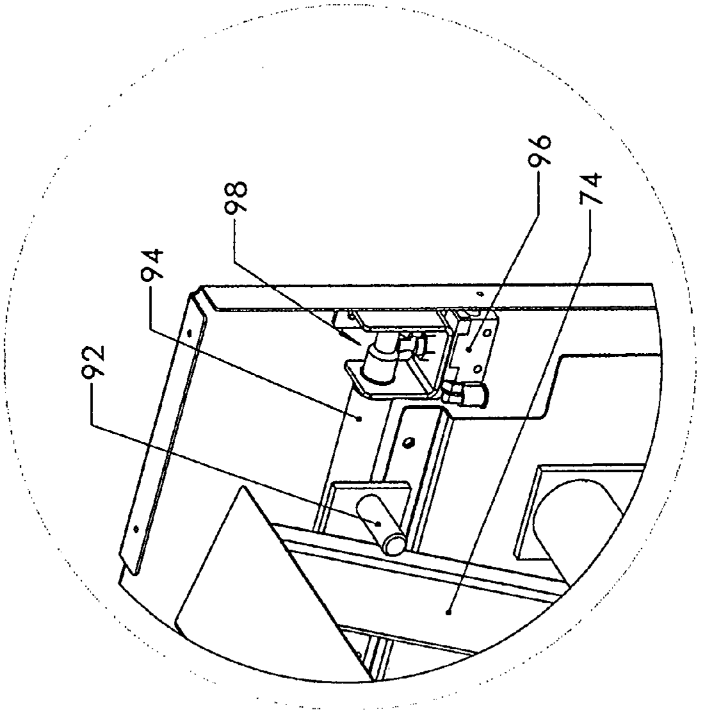
FIG. 26 is an enlarged view of the contents of the circle c in FIG. 25

The operating position of the pusher 70 (most rearward position of the element 78) is determined by the position of a stop pin 92 which is adjustably position (to match with the width of the carton to be taped by the lead screw 94 the adjustment of which is described in more detail with reference to FIGS. 25 and 26. The arm 74 as it is moved rearward by the insertion of a carton into the machine until the arm 74 contacts the pin 92 which stops further movement and properly centers the carton. The backstop lead screw 94 is mounted to slide slightly so that when the backstop support arm 74 hits its stop pin 92 it pushes the lead screw back slightly and triggers the start valve 96 which initiates the taping operation. The start valve mechanism and mount is shown in more detail in FIG. 26.

The present invention preferably has a floating hub tape mounting in the form of an idler 500 (see FIG. 22 and 23) wherein the tape roll 502 is mounted with it's rotational axis parallel to the direction of tape movement when it is pulled by the gripper 10 so that the tape must twist so that is adhesive surface rides over the roll 216 and onto the plate 204. This is considerably less expensive than a conventional mount. Plus, the roll resting on a bottom idler 500 and unwinding around this idler 500 provides more constant unwind tension. A further advantage of this arrangement is that it provides for a very compact machine length and allows for product to be fed in alongside the operator, providing further flexibility.

Figure 23:
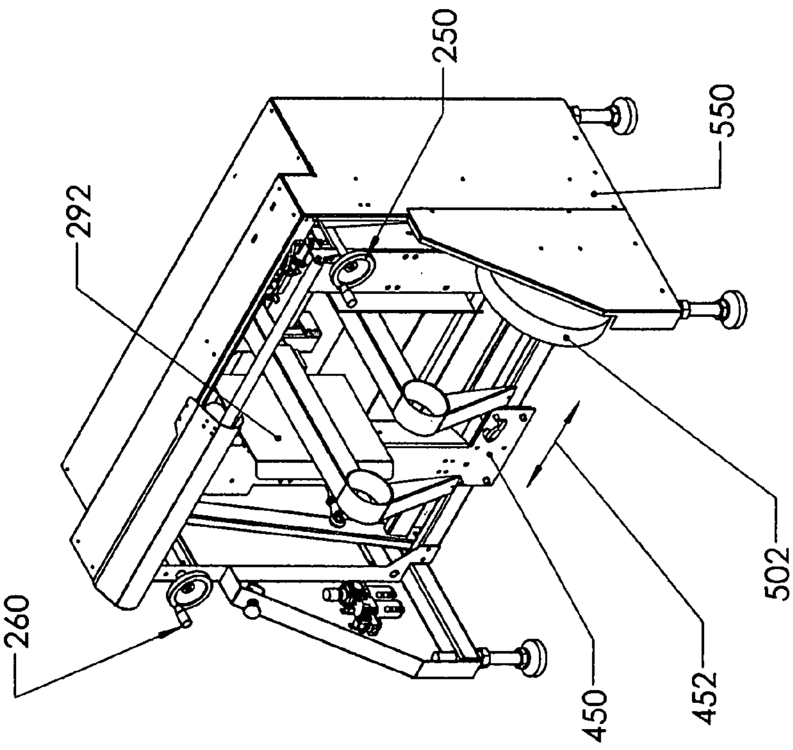
FIG. 23 is an isometric illustration similar to FIG. 22 with parts omitted showing the view from the opposite corner of the machine
Figure 22:
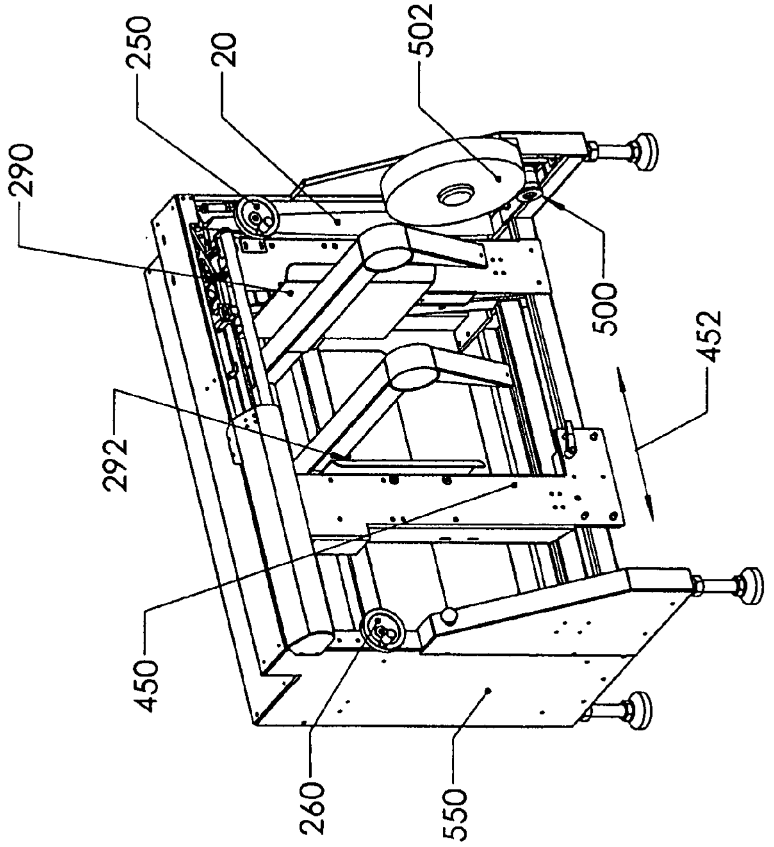
FIG. 22 is an isometric illustration with parts omitted showing the position of the tape roll
Figure 24:
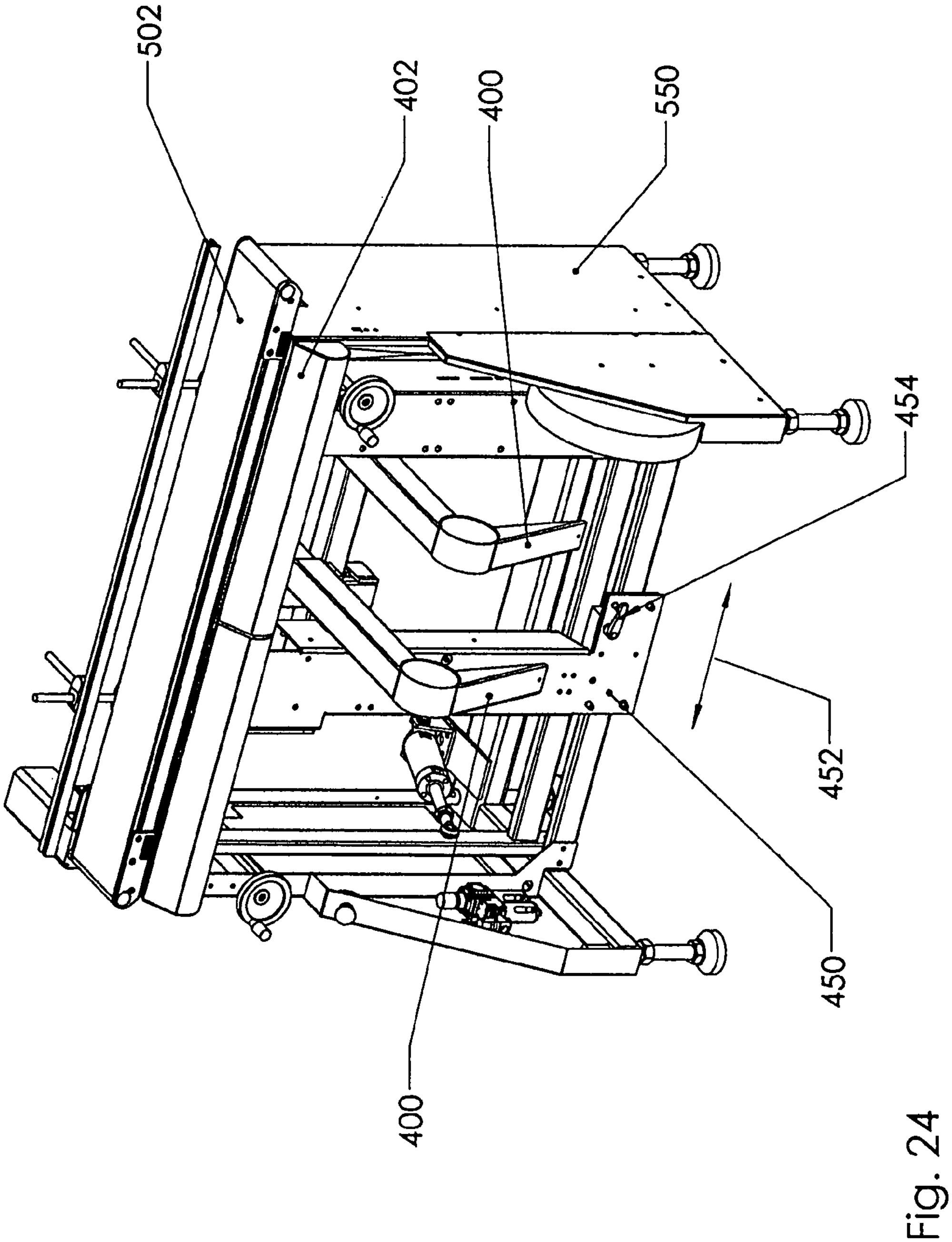
FIG. 24 is an isometric illustration with parts omitted of the front (carton entry side) of the machine.

FIGS. 22, 23 and 24 also show the frame 450 for mounting the leading wipe down roller 28. The frame 450 is moveable as indicated by the arrow 452 relative to the main frame 550 of the machine and is clamped in adjusted position for the carton being taped by a suitable clamp the handle of which is shown at 454 in FIG. 24. The position of this frame 450 determines the position of the wipe down roller 28 as well as the stop position of draw cylinder (not shown) for moving the gripper 10 between the clamping and cut off station 14 and the extended position 22 of the gripper 10.

Figure 25:
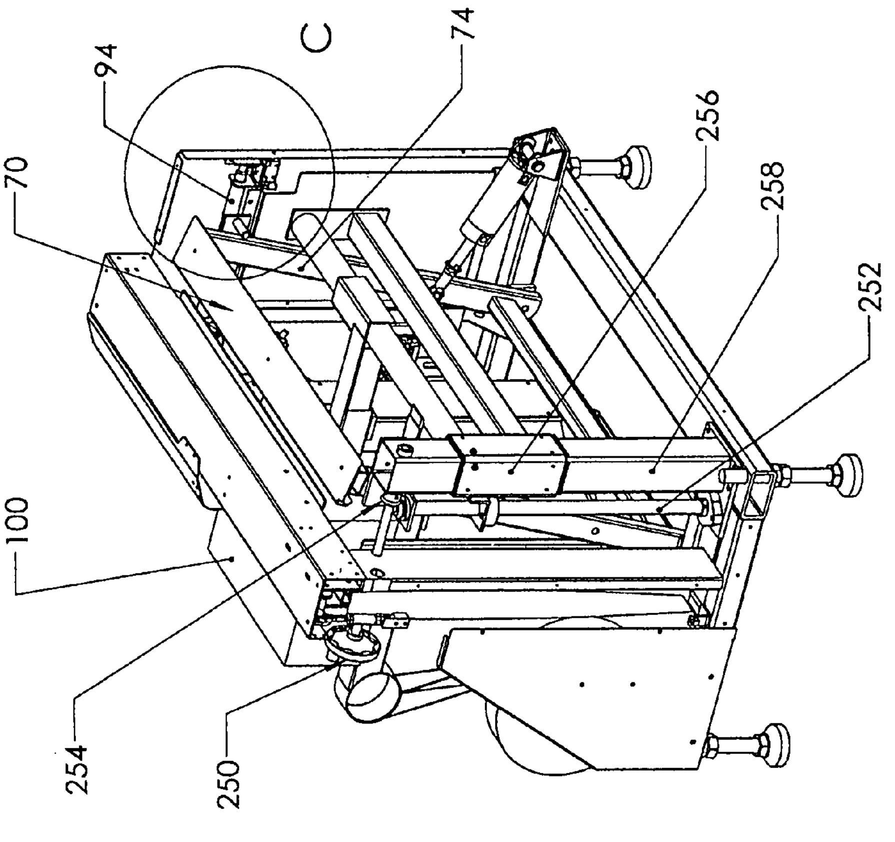
FIG. 25 is a view from the back or rear of the machine showing the height and width adjustments in more detail

Attention is directed to FIG. 25 which illustrates the width and height adjustment mechanisms The hand wheel 250 at the right hand side of the machine adjusts the relative height of the case support platform 400 to accommodate different case 100 heights. Movement of the hand wheel 250 rotates the vertically placed lead screw 252 through bevel gears 254 and adjusts the level of the frame 256 sliding on the support column 258.

At the left hand side is another hand wheel 260 which drives the lead screw 94 to which the backstop stop pin 94 is coupled. As above described this lead screw 94 has slight fore and aft movement to allow the lead screw 94 to activate the start valve 96 through a ramp or bevel 98 at the rear end of the lead screw. When a case is advanced into the machine, the backstop support arm 74 rotates until it strikes the stop pin 92. This drives the lead screw 94 back slightly and a beveled ramp 98 on the lead screw activates the start valve 96.

With the construction of the present invention a conveyor 552 may easily be mounted on the top of the machine so product can be delivered to the edge of the open case and then simply dropped into the case and sealed. Other product delivery means can be brought very close to the open case facilitating packing.

The present invention allows for very rapid or even random adjustment. The leading wipe down frame 450 slides easily and quickly, and the case height can be easily configured to be rapidly or remotely set. (Rapid packing fork adjustments are described in U.S. Pat. No. 6,726,613 related to the packing forks) In remote configuration, if a self centering mechanism is added, the machine sequence can be changed so that the machine starts with the width and height at minimum. The gripper starts out at the clamping and cut off station and once the size is set, travels to the left as the operator is pushing a case in. When the case hits center, the backstop 70 is locked and the tape is applied.

The various drives that have been schematically indicated by the arrow such as arrows 12, 30 56 may be comprised of any suitable drive system; generally it is preferred to use pneumatic drives.

Having described the invention, modifications will be evident to those skilled in the art without departing from the scope of the invention as defined in the appended claims.

We claim:

1. A bow taper comprising a puller and gripper moveable from a clamping and cut-off station to an extended position to pull tape from said clamping and cut-off station and provide a length of tape between said clamping and cut-off station and said extended position, a lead wipe down roller in said extended position, said lead wipe down roller being moveable between a lead wipe down roller home position and a lead wipe down roller extended tape applied position, a clamping and cut-off mechanism in said clamping and cut-off station, said clamping and cut off mechanism including a cut-off knife and a releasable clamp, a trailing wipe down roller positioned adjacent to said clamping and cut-off station and moveable between a trailing wipe down roller home position and a trailing wipe down roller extended position, means to move said lead wipe down roller between said lead wipe down roller home position and said lead wipe down roller extended tape applied position and another means to move said trailing wipe down roller between said trailing wipe down roller home position and said trailing wipe down roller extended position, and means to activate said cut-off knife to cut said tape and means to activate said clamp to release said tape.

2. A bow taper as defined in claim 1 wherein said clamp has a pad for engaging a adhesive side of said tape, and wherein said pad is made of silicone rubber.

3. A bow taper as defined in claim 1 wherein said puller and gripper is provided with jaws between which said tape is gripped and where said jaws are each provide with a pad of silicone rubber to engage said tape.

4. A bow taper as defined in claim 1 further comprising a backstop, said backstop being positioned to ensure that a case being processed is in proper taping position for tape application and said backstop is provided with means to eject said case from said taping position.

5. A bow taper as defined in claim 1 further comprising a transverse roller positioned to wipe said tape after application to a case being processed against an adjacent wall of said case when said case is being removed from said taper.

6. A bow taper as defined in claim 2 wherein said puller and gripper is provided with jaws between which said tape is gripped and where said jaws are each provide with a pad of silicone rubber to engage said tape.

7. A bow taper as defined in claim 2 further comprising a backstop, said backstop being positioned to ensure that a case being processed is in proper taping position for tape application and said backstop is provided with means to eject said case from said taping position.

8. A bow taper as defined in claim 2 further comprising a transverse roller positioned to wipe said tape after application to a case being processed against an adjacent wall of said case when said case is being removed from said taper.

9. A bow taper as defined in claim 3 further comprising a backstop, said backstop being positioned to ensure that a case being processed is in proper taping position for tape application and said backstop is provided with means to eject said case from said taping position.

10. A bow taper as defined in claim 3 further comprising a transverse roller positioned to wipe said tape after application to a case being processed against an adjacent wall of said case when said case is being removed from said taper.

11. A bow taper as defined in claim 4 further comprising a transverse roller positioned to wipe said tape after application to a case being processed against an adjacent wall of said case when said case is being removed from said taper.

* * * * *